US008214127B2

(12) United States Patent
Whitney et al.

(10) Patent No.: US 8,214,127 B2
(45) Date of Patent: Jul. 3, 2012

(54) TORQUE BASED CLUTCH FUEL CUT OFF

(75) Inventors: Christopher E. Whitney, Highland, MI (US); Jun Lu, Novi, MI (US); Robert C. Simon, Jr., Brighton, MI (US); Jeffrey M. Kaiser, Highland, MI (US); Todd R. Shupe, Milford, MI (US)

(73) Assignee: GM Global Technology Operations LLC (US)

( * ) Notice: Subject to any disclaimer, the term of this patent is extended or adjusted under 35 U.S.C. 154(b) by 434 days.

(21) Appl. No.: 12/326,404

(22) Filed: Dec. 2, 2008

(65) Prior Publication Data

US 2010/0082220 A1 Apr. 1, 2010

Related U.S. Application Data

(60) Provisional application No. 61/101,856, filed on Oct. 1, 2008.

(51) Int. Cl.
*G06F 19/00* (2011.01)
*F02D 13/06* (2006.01)
*F02D 17/02* (2006.01)

(52) U.S. Cl. .................... 701/102; 701/112; 123/198 F; 123/325; 123/332

(58) Field of Classification Search .................. 701/102, 701/104, 110, 112; 123/198 F, 325, 332, 123/478, 480, 481; 70/104, 110, 112
See application file for complete search history.

(56) References Cited

U.S. PATENT DOCUMENTS

| | | | | | |
|---|---|---|---|---|---|
| 4,941,441 | A | * | 7/1990 | Watanabe | 123/325 |
| 5,437,253 | A | * | 8/1995 | Huffmaster et al. | 123/399 |
| 5,572,970 | A | * | 11/1996 | Fukumura | 123/198 F |
| 5,584,266 | A | * | 12/1996 | Motose et al. | 123/73 A |
| 5,769,054 | A | * | 6/1998 | Schnaibel et al. | 123/406.47 |
| 5,797,371 | A | * | 8/1998 | Nonaka | 123/481 |
| 6,619,258 | B2 | * | 9/2003 | McKay et al. | 123/350 |
| 6,736,108 | B2 | * | 5/2004 | Rayl et al. | 123/406.23 |
| 6,769,403 | B2 | * | 8/2004 | Rayl et al. | 123/406.23 |
| 7,168,239 | B2 | * | 1/2007 | Ingram et al. | 60/285 |
| 7,406,948 | B2 | * | 8/2008 | Hirowatari et al. | 123/480 |
| 7,418,942 | B2 | * | 9/2008 | Niimi | 123/327 |
| 7,497,805 | B2 | * | 3/2009 | Seaman et al. | 477/185 |
| 7,621,126 | B2 | * | 11/2009 | Kolmanovsky et al. | 60/600 |
| 7,757,666 | B2 | * | 7/2010 | Whitney et al. | 123/481 |
| 7,886,712 | B2 | * | 2/2011 | Hartmann et al. | 123/305 |
| 2011/0130902 | A1 | * | 6/2011 | Heisel et al. | 701/22 |

* cited by examiner

*Primary Examiner* — Mahmoud Gimie
*Assistant Examiner* — David Hamaoui

(57) ABSTRACT

An engine control system comprises a clutch cut off enable module and a torque control module. The clutch cut off enable module generates an enable signal based on a clutch engagement signal and an accelerator pedal signal. The torque control module reduces a spark advance of an engine to a minimum value and disables fueling of cylinders of the engine based on the enable signal. The minimum value is a minimum allowed spark advance for current engine airflow.

21 Claims, 7 Drawing Sheets

TORQUE BASED CLUTCH FUEL CUT OFF

CROSS-REFERENCE TO RELATED APPLICATIONS

This application claims the benefit of U.S. Provisional Application No. 61/101,856, filed on Oct. 1, 2008. The disclosure of the above application is incorporated herein by reference.

FIELD

The present disclosure relates to methods and apparatus for cutting off fuel in a vehicle, and more particularly to cutting off fuel based on clutch engagement in a torque-based system.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Torque model data is often gathered on a dynamometer with all cylinders of an engine being fueled. However, some engines now use partial cylinder deactivation to reduce pumping losses and increase fuel economy. For example, four cylinders out of an eight cylinder engine may be deactivated to reduce pumping losses. In addition, some engines may deactivate all cylinders of the engine during deceleration, which reduces fuel usage. In addition, the pumping losses and rubbing friction of the engine with all cylinders deactivated may create a negative torque (braking torque) that helps to slow the vehicle. To accommodate these types of engines, adjustments may be made for torque estimation and control to account for the number of cylinders that are actually being fueled.

The torque produced by the activated (fueled) cylinders may be referred to as indicated torque or cylinder torque. Flywheel torque may be determined by subtracting rubbing friction, pumping losses, and accessory loads from the indicated torque. Therefore, in one approach to estimating torque with partial cylinder deactivation, the indicated torque is multiplied by a fraction of cylinders being fueled to determine a fractional indicated torque. The fraction is the number of cylinders being fueled divided by the total number of cylinders. Rubbing friction, pumping losses, and accessory loads can be subtracted from the fractional indicated torque to estimate an average torque at the flywheel (brake torque) for partial cylinder deactivation.

SUMMARY

An engine control system comprises a clutch cut off enable module and a torque control module. The clutch cut off enable module generates an enable signal based on a clutch engagement signal and an accelerator pedal signal. The torque control module reduces a spark advance of an engine to a minimum value and disables fueling of cylinders of the engine based on the enable signal. The minimum value is a minimum allowed spark advance for current engine airflow.

A method comprises generating an enable signal based on a clutch engagement signal and an accelerator pedal signal; determining a minimum value of allowed spark advance for current engine airflow; and reducing a spark advance of an engine to the minimum value and disabling fueling of cylinders of the engine based on the enable signal.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1A:
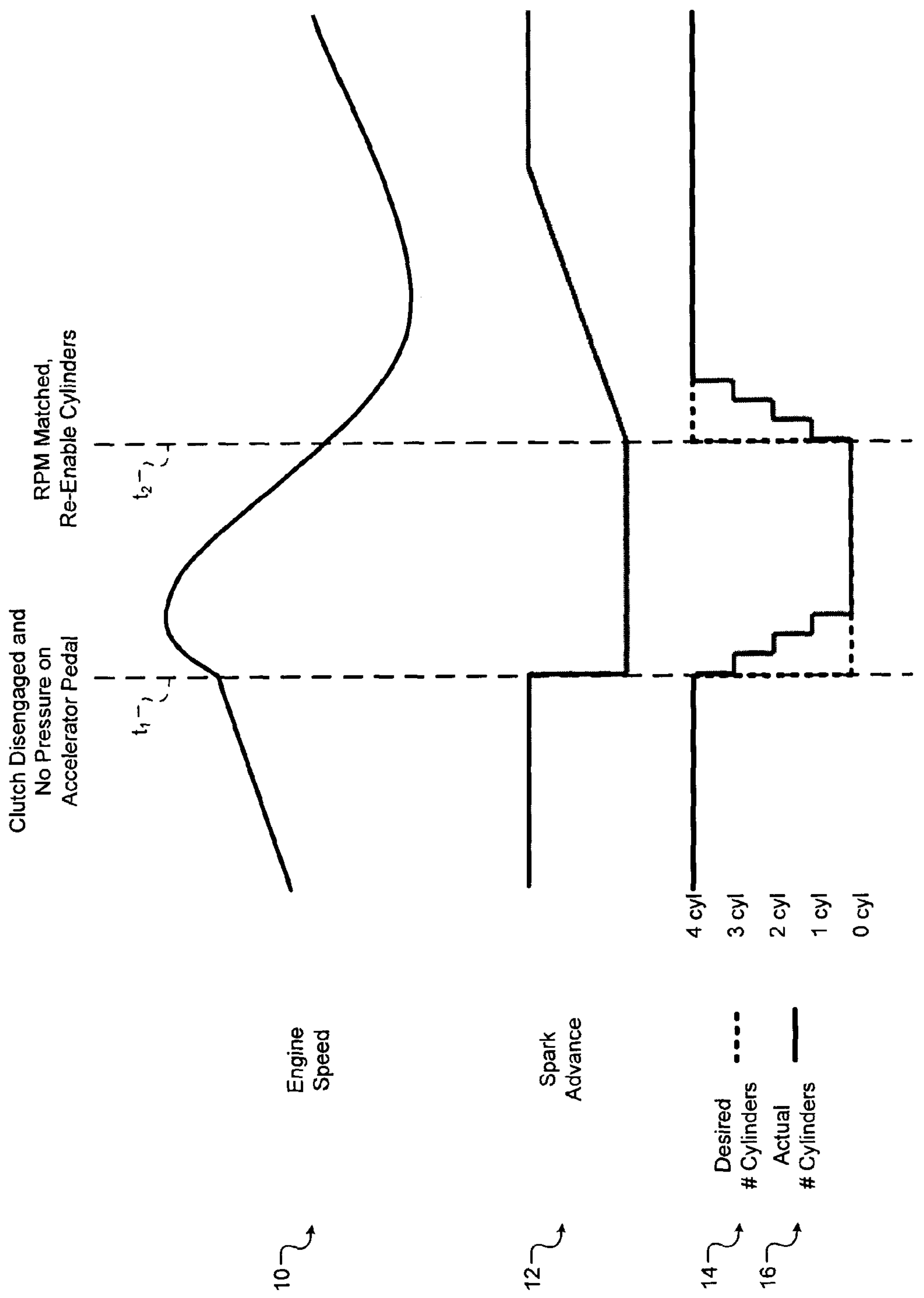
FIG. 1A is a graphical depiction of clutch fuel cut off used to reject engine speed flare according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

In an internal combustion engine, fuel and spark are relatively fast actuators. The term fast is used in contrast to air flow (which may be measured as air per cylinder), which changes slowly as the throttle valve opens or closes. Removing fuel from one or more cylinders (deactivating the cylinders) and decreasing (retarding) the spark advance can both be used to achieve fast changes in torque.

When controlling an internal combustion engine, a rapid transition to minimum torque may be requested. The minimum torque the engine can produce with all cylinders on is limited by the minimum amount of air flow needed to maintain adequate combustion in all cylinders. To reduce the torque of the engine even further, cylinders can be deactivated.

For example, when a driver depresses the clutch pedal of a manual transmission, the clutch disengages the engine from the drivetrain. Without the drivetrain load, the engine speed may increase, or flare, even if the driver has removed their foot from the accelerator pedal. This engine flare may be mitigated by requesting a minimum torque from the engine controller.

To produce the greatest reduction in engine flare, the minimum torque requested may be an engine off torque, where all cylinders are deactivated by halting fuel injection. The engine therefore produces no positive torque, and frictional losses, pumping losses, and/or accessory loads in the engine produce negative torque, which slows the engine speed.

Once the engine speed reaches a desired value, cylinders can be reactivated. For example, an engine controller may assume that by depressing the clutch pedal and removing their foot from the accelerator pedal, the driver intends to perform an upshift. The engine controller may therefore decrease the engine speed to a speed that will match the speed of the drivetrain at the next higher gear ratio.

Referring now to FIG. 1A, a graphical depiction of clutch fuel cut off used to reject engine speed flare is presented. Engine speed is shown at 10. The engine speed 10 increases up to time $t_1$. At time $t_1$, the clutch is disengaged and no pressure is placed on the accelerator pedal. Because the clutch has disengaged the engine from the drivetrain, the engine speed increases, or flares, after time $t_1$.

Therefore, at time $t_1$, a spark advance, shown at 12, is decreased. In addition, a desired number of active (fueled) cylinders 14 is decreased from four to zero. In this exemplary illustration, a four-cylinder engine is shown, although the principles of the present disclosure apply to an engine having any number of cylinders.

An actual number of cylinders 16 providing power does not immediately decrease from four to zero, for reasons explained in more detail below. In brief, fuel to a given cylinder may be disabled at certain times, so that fuel is not interrupted to a cylinder prematurely, resulting in a cylinder being only partially fueled. Partial fueling of a cylinder may cause inefficient combustion, increased fouling, and increased emissions. Further, once fuel provided to a cylinder is disabled, two crankshaft revolutions are required before the absence of fuel in the cylinder results in no combustion during the power stroke and is realized as a decrease in torque.

Because the spark advance has been reduced and the number of fueled cylinders has been reduced, the engine speed 10 decreases after the initial flare following time $t_1$. At time $t_2$, the engine speed 10 has been reduced to a predetermined speed, and cylinders may be reactivated. The predetermined speed may be the engine speed corresponding to the next gear ratio. As shown in FIG. 1A, the engine speed 10 may continue to drop after time $t_2$. Therefore, the predetermined speed may be set higher than the engine speed that matches the next gear ratio.

The spark advance 12 may be linearly increased starting at time $t_2$. Although the desired number of cylinders 14 is increased from zero to four at time $t_2$, the actual number of cylinders 16 increases in a step-wise fashion. Again, this is because fuel may be activated for a given cylinder at a certain time, and because torque from that cylinder will not be realized until the provided fuel is combusted.

Because the spark advance 12 stays level between times $t_1$ and $t_2$, the spark advance at time $t_1$ may be determined by the spark advance used for a single cylinder at time $t_2$. This spark advance may not be the minimum spark advance possible, and therefore engine torque is not reduced as much as possible at time $t_1$. In addition, as each cylinder turns on after time $t_2$, engine torque will have a similar step-wise profile. This step-wise torque increase may be experienced by the driver as a drivability problem or as a noise, vibration, or harshness issue.

Figure 1B:
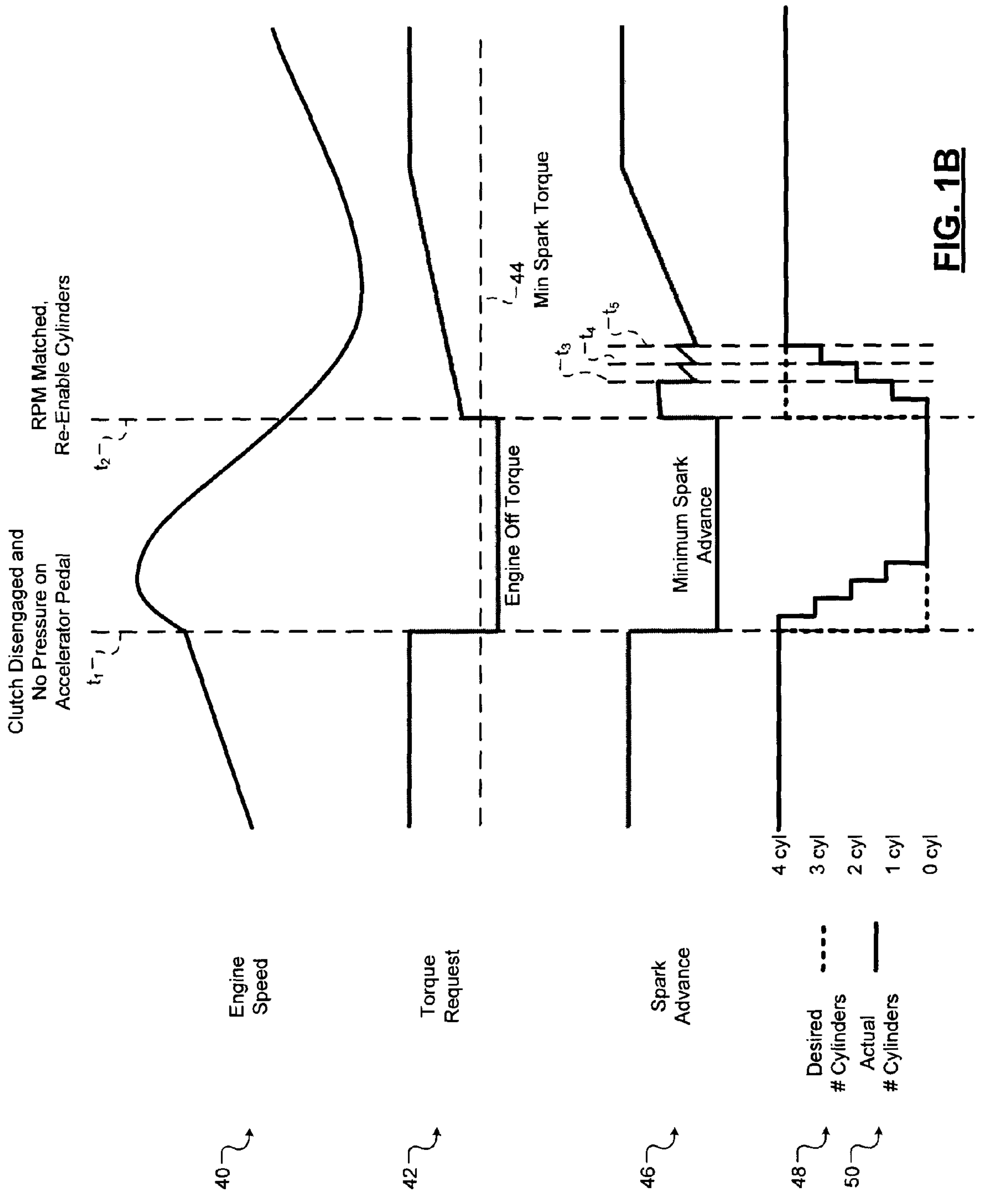
FIG. 1B is a graphical depiction of clutch fuel cut off used to reject engine speed flare in a torque-based system according to the principles of the present disclosure.

Referring now to FIG. 1B, a graphical depiction of clutch fuel cut off in a torque-based system is depicted. Engine speed is shown at 40 and may increase up until time $t_1$. At time $t_1$, the clutch is disengaged and pressure is removed from the accelerator pedal. A torque request 42 may therefore be reduced at time $t_1$ to an engine off torque. The engine off torque is less than a minimum spark torque 44, which indicates the minimum torque the engine can produce by reducing spark advance while still running.

As a result of this torque decrease, a spark advance 46 may be decreased. The spark advance 46 may be decreased to a minimum spark advance. The minimum spark advance may be defined as the lowest spark advance that still causes complete combustion and avoids misfire. Incomplete combustion may result in unburned fuel being exhausted from the cylinder, which may increase emissions and fouling.

By reducing the spark advance 46 to this minimum value, the torque produced by the engine is quickly reduced as much as reducing the spark advance allows. In addition, the desired number of cylinders 48 may be decreased from four to zero. The actual number of cylinders producing torque 50 decreases in a step-wise fashion from four to zero as fuel for each cylinder is disabled and each cylinder stops producing torque from combusting fuel.

As the engine speed 40 falls, a predetermined speed is reached at time $t_2$. This predetermined speed may be greater than a desired speed, as the engine speed 40 may continue to fall after time $t_2$, as illustrated in FIG. 1B. At time $t_2$, the torque request 42 may be increased.

The torque request 42 may be increased to the minimum spark torque 44 or to a level above the minimum spark torque 44, as shown in FIG. 1B. The value of this torque request may be determined based upon a predetermined percentage of a difference between the minimum spark torque 44 and a driver requested torque.

The spark advance 46 is therefore increased at time $t_2$ to allow for the increased torque request to be produced. As the first cylinder becomes active, the first cylinder uses this value of the spark advance 46. As the second cylinder turns on at time $t_3$, the spark advance 46 may be abruptly decreased to offset the added torque of the second cylinder.

By coordinating the timing of this spark advance decrease with the second cylinder turning on, the torque increase when the second cylinder turns on can be reduced. The spark advance 46 can then be ramped up. Minimizing the abrupt torque increase of a cylinder turning on smoothes the increase in torque, and may provide better drivability.

At time $t_4$, the third cylinder turns on, and a corresponding decrease in the spark advance 46 is made. The spark advance 46 is then ramped up until time $t_5$, when the fourth cylinder is turned on. At time $t_5$, therefore, the spark advance 46 is abruptly decreased. Now that all cylinders are activated, the spark advance 46 ramps up to follow the torque request 42. Once the torque request 42 reaches the driver desired torque, the torque request 42 levels out. The spark advance 46 therefore also levels out at this time.

Figure 2:
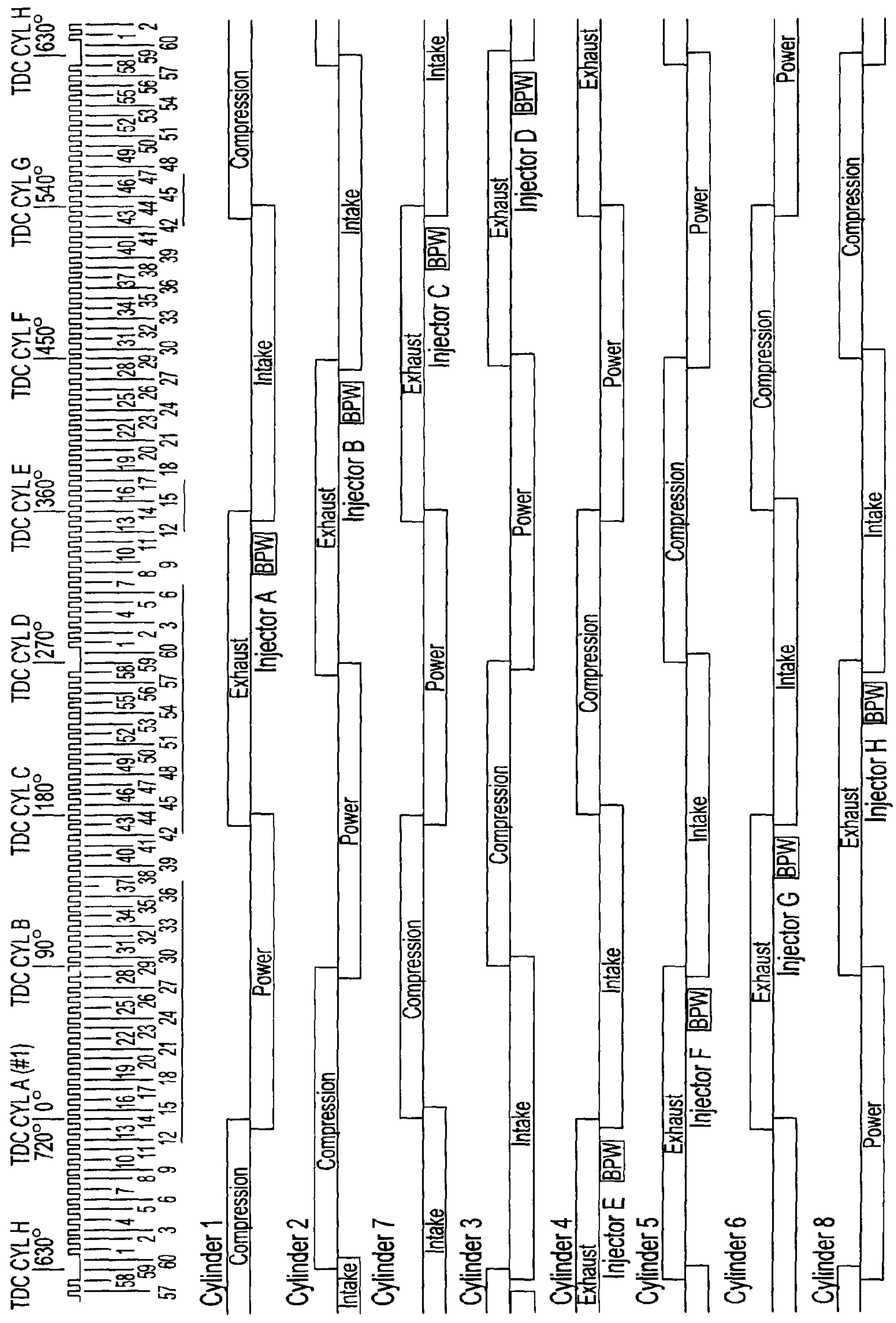
FIG. 2 is a graphical depiction of cylinder event timing in an exemplary V8 engine according to the principles of the present disclosure.

Referring now to FIG. 2, a graphical depiction of cylinder event timing in an exemplary V8 engine is presented. Although an exemplary V8 engine timing diagram is shown, the principles of the present disclosure apply to any number of cylinders and any physical configuration or firing order of those cylinders. At the top of FIG. 2 is a square wave indicating teeth on a crankshaft wheel. The X axis represents crankshaft angle, and is shown between 0 and 720 degrees (two revolutions) because cylinders fire every two revolutions.

The 8 cylinders are labeled with letters, from A to H. There are two gaps shown in the crankshaft teeth, one at top dead center (TDC) of cylinder D, and one at TDC of cylinder H. These gaps may be used for synchronizing the crankshaft signal. The time when a piston is at its topmost position, which is the point at which the air/fuel mixture is most compressed, is referred to as TDC.

A portion of the crankshaft period on the right of FIG. 2 is repeated on the left of FIG. 2. This explains why TDC of cylinder H appears at both the left and the right. Ignition timing control may occur at a defined time for each cylinder. For example only, these events may be defined at 72° or 73.5° before TDC of each cylinder.

Timelines of the four strokes (intake, compression, power, and exhaust) are shown for each cylinder. The cylinders are arranged in firing order from top to bottom, A to H. The physical cylinder number is indicated at the left of each timeline.

The end of the intake stroke for a cylinder may be defined as the time when the corresponding intake valve closes. The fuel boundary represents the last time at which fuel released from the fuel injectors will make it into the combustion chamber in that intake stroke. Normally, this will be slightly before the end of the intake stroke. For applications where fuel is injected directly into the combustion chamber, the fuel boundary may be at or after the end of the intake stroke.

After the fuel boundary, the fuel injector corresponding to the cylinder can begin spraying fuel for the next intake stroke. The fuel injector may begin spraying fuel during the exhaust stroke so that a fuel-air mixture will be ready when the intake valve opens. Fuel may be sprayed earlier, such as in the compression or power strokes, to allow for more mixing of air and fuel and/or to allow for a longer period in which to inject a greater amount of fuel.

Because of the long period during which fuel may be sprayed, the deactivation or activation of fuel to a cylinder may be limited to the fuel boundaries. Therefore, when a request to activate cylinder 1 is received, the fuel injector for cylinder 1 may not be activated until the next fuel boundary is reached. If the request is received slightly after a fuel boundary, nearly two crankshaft revolutions will occur before the fuel boundary is reached.

Even after the fuel injector is enabled at the fuel boundary, the combustion chamber has not yet received any fuel. The following compression, power, and exhaust strokes therefore operate without fuel, thereby generating no additional torque. When the next intake stroke is reached, the combustion chamber receives fuel from the now-enabled fuel injector, and at the following power stroke, additional torque is then realized by the engine.

The step-wise increase and decrease of actual cylinder activation in FIGS. 1A-1B is thereby demonstrated in FIG. 2. The first cylinder to reach a fuel boundary after a cylinder enable command is received will have its fuel enabled. Fuel for the remaining cylinders is then enabled in the order shown in FIG. 2. For example, if the fuel boundary for cylinder 3 is reached first after a cylinder activation request, fuel is enabled to cylinder 3, followed by cylinder 4, cylinder 5, etc. The power stroke of cylinder 3 will then be the first power stroke for which fuel is present. The cylinders will begin generating power in the same order shown in FIG. 2. Therefore, cylinder 3 begins generating power in its power stroke, followed by the power stroke of cylinder 4, cylinder 5, etc. Deactivation of the cylinders follows a similar pattern.

Figure 3:
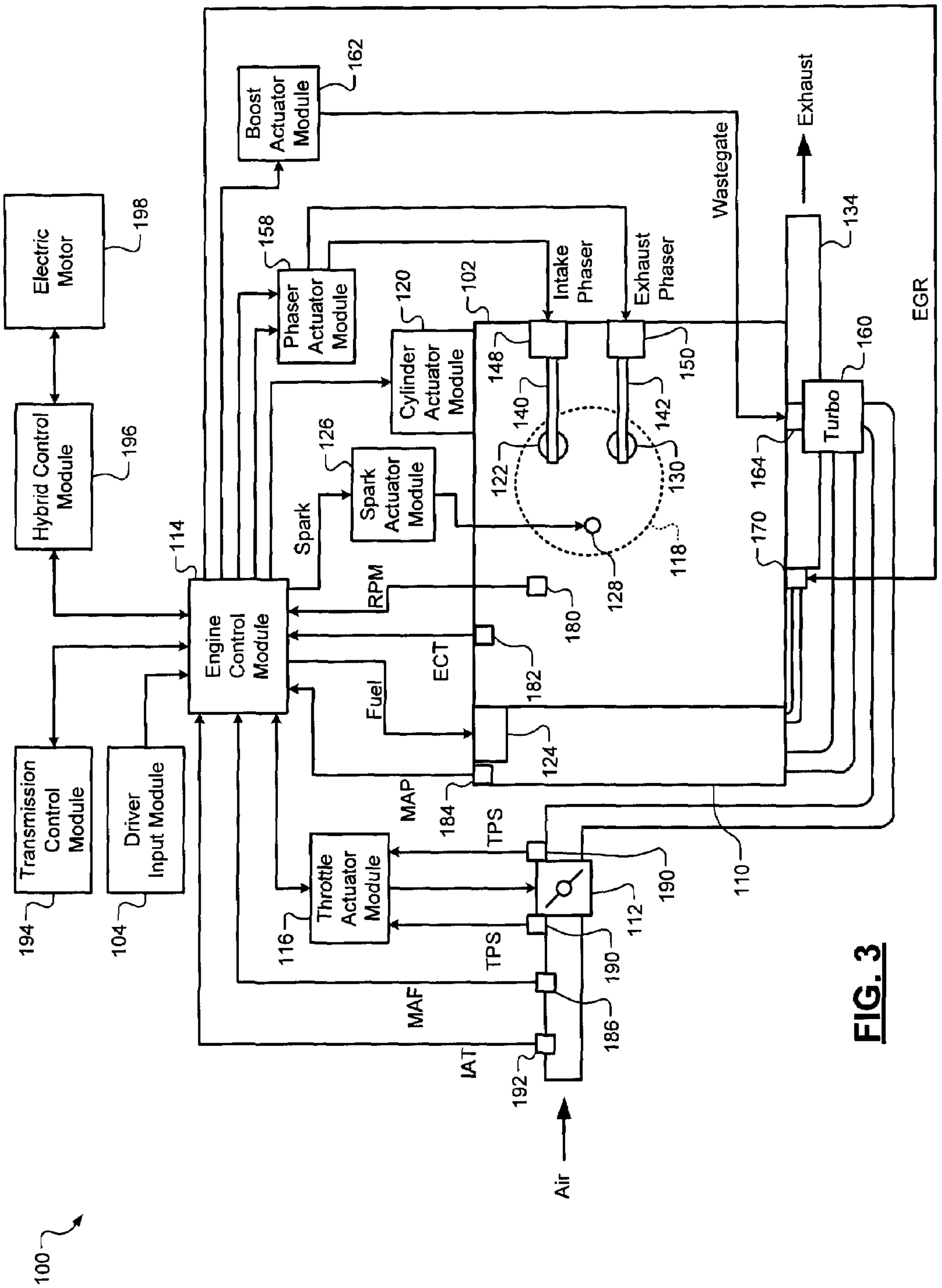
FIG. 3 is a functional block diagram of an exemplary engine system according to the principles of the present disclosure.

Referring now to FIG. 3, a functional block diagram of an exemplary engine system 100 is presented. The engine system 100 includes an engine 102 that combusts an air/fuel mixture to produce drive torque for a vehicle based on a driver input module 104. Air is drawn into an intake manifold 110 through a throttle valve 112. An engine control module (ECM) 114 commands a throttle actuator module 116 to regulate opening of the throttle valve 112 to control the amount of air drawn into the intake manifold 110.

Air from the intake manifold 110 is drawn into cylinders of the engine 102. While the engine 102 may include multiple cylinders, for illustration purposes, a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders to improve fuel economy.

Air from the intake manifold 110 is drawn into the cylinder 118 through an intake valve 122. The ECM 114 controls the amount of fuel injected by a fuel injection system 124 to achieve a desired air/fuel ratio. The fuel injection system 124 may inject fuel into the intake manifold 110 at a central location or may inject fuel into the intake manifold 110 at multiple locations, such as near the intake valve of each of the cylinders. Alternatively, the fuel injection system 124 may inject fuel directly into the cylinders. The cylinder actuator module 120 may control to which cylinders the fuel injection system 124 injects fuel.

The injected fuel mixes with the air and creates the air/fuel mixture in the cylinder 118. A piston (not shown) within the cylinder 118 compresses the air/fuel mixture. Based upon a signal from the ECM 114, a spark actuator module 126 energizes a spark plug 128 in the cylinder 118, which ignites the air/fuel mixture. The timing of the spark may be specified relative to TDC.

The combustion of the air/fuel mixture drives the piston down, thereby driving a rotating crankshaft (not shown). The piston then begins moving up again and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders. The cylinder actuator module 120 may deactivate cylinders by halting provision of fuel and spark and/or disabling their exhaust and/or intake valves.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 controls the intake cam phaser 148 and the exhaust cam phaser 150 based on signals from the ECM 114.

The engine system 100 may include a boost device that provides pressurized air to the intake manifold 110. For example, FIG. 3 depicts a turbocharger 160. The turbocharger 160 is powered by exhaust gases flowing through the exhaust system 134, and provides a compressed air charge to the intake manifold 110. The turbocharger 160 may compress air before the air reaches the intake manifold 110.

A wastegate 164 may allow exhaust gas to bypass the turbocharger 160, thereby reducing the turbocharger's output (or boost). The ECM 114 controls the turbocharger 160 via a boost actuator module 162. The boost actuator module 162 may modulate the boost of the turbocharger 160 by controlling the position of the wastegate 164.

An intercooler (not shown) may dissipate some of the compressed air charge's heat, which is generated by air being compressed. The compressed air charge may also absorb heat because of the air's proximity to the exhaust system 134. Alternate engine systems may include a supercharger that provides compressed air to the intake manifold 110 and is driven by the crankshaft.

The engine system 100 may include an exhaust gas recirculation (EGR) valve 170, which selectively redirects exhaust gas back to the intake manifold 110. In various implementations, the EGR valve 170 may be located after the turbocharger 160. The engine system 100 may measure the speed of the crankshaft in revolutions per minute (RPM) using an RPM sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass of air flowing into the intake manifold 110 may be measured using a mass air flow (MAF) sensor 186. In various implementations, the MAF sensor 186 may be located in a housing with the throttle valve 112.

The throttle actuator module 116 may monitor the position of the throttle valve 112 using one or more throttle position sensors (TPS) 190. The ambient temperature of air being drawn into the engine system 100 may be measured using an intake air temperature (IAT) sensor 192. The ECM 114 may use signals from the sensors to make control decisions for the engine system 100.

The ECM 114 may communicate with a transmission control module 194 to coordinate shifting gears in a transmission (not shown). For example, the ECM 114 may reduce torque during a gear shift. The ECM 114 may communicate with a hybrid control module 196 to coordinate operation of the engine 102 and an electric motor 198. The electric motor 198 may also function as a generator, and may be used to produce electrical energy for use by vehicle electrical systems and/or for storage in a battery. In various implementations, the ECM 114, the transmission control module 194, and the hybrid control module 196 may be integrated into one or more modules.

To abstractly refer to the various control mechanisms of the engine 102, each system that varies an engine parameter may be referred to as an actuator. For example, the throttle actuator module 116 can change the blade position, and therefore the opening area, of the throttle valve 112. The throttle actuator module 116 can therefore be referred to as an actuator, and the throttle opening area can be referred to as an actuator position or actuator value.

Similarly, the spark actuator module 126 can be referred to as an actuator, while the corresponding actuator position may be the amount of spark advance. Other actuators may include the boost actuator module 162, the EGR valve 170, the phaser actuator module 158, the fuel injection system 124, and the cylinder actuator module 120. The term actuator position with respect to these actuators may correspond to boost pressure, EGR valve opening, intake and exhaust cam phaser angles, air/fuel ratio, and number of cylinders activated, respectively.

Figure 4:
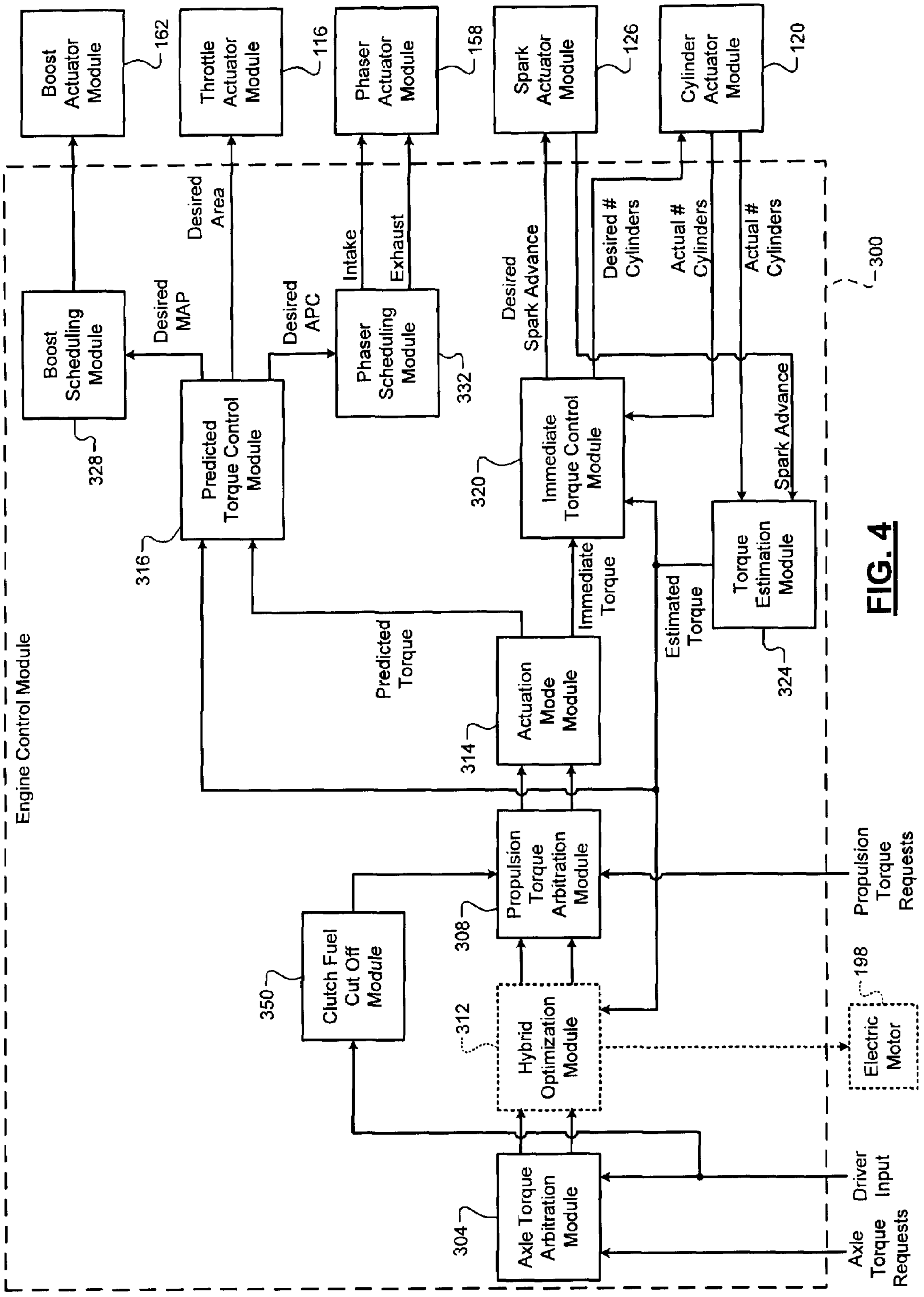
FIG. 4 is a functional block diagram of an exemplary engine control system according to the principles of the present disclosure.

Referring now to FIG. 4, a functional block diagram of an exemplary engine control system is presented. An engine control module (ECM) 300 includes an axle torque arbitration module 304. The axle torque arbitration module 304 arbitrates between a driver input from the driver input module 104 and other axle torque requests. For example, driver inputs may include accelerator pedal position.

Other axle torque requests may include a torque reduction requested during wheel slip by a traction control system and torque requests to control speed from a cruise control system. Torque requests may include target torque values as well as ramp requests, such as a request to ramp torque down to the minimum engine off torque or ramp torque up from the minimum engine off torque.

Axle torque requests may also include requests from an adaptive cruise control module, which may vary a torque request to maintain a predetermined following distance. Axle torque requests may also include torque increases due to negative wheel slip, such as where a tire of the vehicle slips with respect to the road surface when the torque produced by the engine is negative. In various implementations, the driver input module 104 may generate a driver input signal based on direct driver input from the accelerator pedal as well as cruise control commands.

Axle torque requests may also include brake torque management requests and torque requests intended to prevent vehicle over-speed conditions. Brake torque management requests may reduce engine torque to ensure that engine torque does not exceed the ability of the brakes to hold the vehicle when the vehicle is stopped. Axle torque requests may also be made by body stability control systems. Axle torque requests may further include engine cut off requests, such as may be generated when a critical fault is detected.

The axle torque arbitration module 304 outputs a predicted torque and an immediate torque. The predicted torque is the amount of torque that will be required in the future to meet the driver's torque request and/or speed requests. The immediate torque is the amount of currently required to meet temporary torque requests, such as torque reductions when shifting gears or when traction control senses wheel slippage.

The immediate torque may be achieved by engine actuators that respond quickly, while slower engine actuators may be targeted to achieve the predicted torque. For example, a spark actuator may be able to quickly change spark advance, while cam phaser or throttle actuators may be slower to respond. The axle torque arbitration module 304 outputs the predicted torque and the immediate torque to a propulsion torque arbitration module 308.

In various implementations, the axle torque arbitration module 304 may output the predicted torque and immediate torque to a hybrid optimization module 312. The hybrid optimization module 312 determines how much torque should be produced by the engine and how much torque should be produced by the electric motor 198. The hybrid optimization module 312 then outputs modified predicted and immediate torque values to the propulsion torque arbitration module 308. In various implementations, the hybrid optimization module 312 may be implemented in the hybrid control module 196 of FIG. 3.

The predicted and immediate torques received by the propulsion torque arbitration module 308 are converted from the axle torque domain (at the wheels) into the propulsion torque domain (at the crankshaft). This conversion may occur before, after, or in place of the hybrid optimization module 312.

The propulsion torque arbitration module 308 arbitrates between the converted predicted and immediate torque and other propulsion torque requests. Propulsion torque requests may include torque reductions for engine over-speed protection, torque increases for stall prevention, and torque reductions requested by the transmission control module 194 to accommodate gear shifts. Propulsion torque requests may also include torque requests from a speed control module, which may control engine speed during idle and coastdown, such as when the driver removes their foot from the accelerator pedal.

Propulsion torque requests may also include a clutch fuel cut off, which may reduce engine torque when the driver depresses the clutch pedal in a manual transmission vehicle. Various torque reserves may also be provided to the propulsion torque arbitration module 308 to allow for fast realization of those torque values should they be needed. For example, a reserve may be applied to allow for air conditioning compressor turn-on and/or for power steering pump torque demands.

A catalyst light-off or cold start emissions process may directly vary spark advance for an engine. A corresponding propulsion torque request may be made to balance out the change in spark advance. In addition, the air-fuel ratio of the engine and/or the mass air flow of the engine may be varied, such as by diagnostic intrusive equivalence ratio testing and/or new engine purging. Corresponding propulsion torque requests may be made to offset these changes.

Propulsion torque requests may also include a shutoff request, which may be initiated by detection of a critical fault. For example, critical faults may include vehicle theft detection, stuck starter motor detection, electronic throttle control problems, and unexpected torque increases. In various implementations, various requests, such as shutoff requests, may not be arbitrated. For example only, shutoff requests may always win arbitration or may override arbitration altogether. The propulsion torque arbitration module 308 may still receive these requests so that, for example, appropriate data can be fed back to other torque requesters. For example, all other torque requestors may be informed that they have lost arbitration.

A clutch fuel cut off module 350 selectively provides a decreasing torque request to the propulsion torque arbitration module 308. This decreasing torque request is generated as shown in more detail in FIGS. 5 and 6. This decreasing torque request may prevail in arbitration over driver requests. Therefore, when the clutch fuel cut off module 350 requests a decrease in torque, the decreased torque may be provided to an actuation mode module 314 by the propulsion torque arbitration module 308.

The actuation mode module 314 receives the predicted torque and the immediate torque from the propulsion torque arbitration module 308. Based upon a mode setting, the actuation mode module 314 determines how the predicted and immediate torques will be achieved. For example, changing the throttle valve 112 allows for a wide range of torque control. However, opening and closing the throttle valve 112 is relatively slow.

Disabling cylinders provides for a wide range of torque control, but may produce drivability and emissions concerns. Changing spark advance is relatively fast, but does not provide much range of control. In addition, the amount of control possible with spark (spark capacity) changes as the amount of air entering the cylinder 118 changes.

According to the present disclosure, the throttle valve 112 may be closed just enough so that the desired immediate torque can be achieved by retarding the spark as far as possible. This provides for rapid resumption of the previous torque, as the spark can be quickly returned to its calibrated timing. In this way, the use of relatively slowly-responding throttle valve corrections is minimized by using the quickly-responding spark retard as much as possible.

The approach the actuation mode module 314 takes in meeting the immediate torque request is determined by a mode setting. The mode setting provided to the actuation mode module 314 may include an indication of modes including an inactive mode, a pleasible mode, a maximum range mode, and an auto actuation mode.

In the inactive mode, the actuation mode module 314 may ignore the immediate torque request. For example, the actuation mode module 314 may output the predicted torque to a predicted torque control module 316. The predicted torque control module 316 converts the predicted torque to desired actuator positions for slow actuators. For example, the predicted torque control module 316 may control desired manifold absolute pressure (MAP), desired throttle area, and/or desired air per cylinder (APC).

An immediate torque control module 320 determines desired actuator positions for fast actuators, such as desired spark advance. The actuation mode module 314 may instruct the immediate torque control module 320 to set the spark advance to a calibrated value, which achieves the maximum possible torque for a given airflow. In the inactive mode, the immediate torque request does not therefore reduce the amount of torque produced or cause the spark advance to deviate from calibrated values.

In the pleasible mode, the actuation mode module 314 may attempt to achieve the immediate torque request using only spark retard. This may mean that if the desired torque reduction is greater than the spark reserve capacity (amount of torque reduction achievable by spark retard), the torque reduction will not be achieved. The actuation mode module 314 may therefore output the predicted torque to the predicted torque control module 316 for conversion to a desired throttle area. The actuation mode module 314 may output the immediate torque request to the immediate torque control module 320, which will retard the spark as much as possible to attempt to achieve the immediate torque.

In the maximum range mode, the actuation mode module 314 may instruct the cylinder actuator module 120 to turn off one or more cylinders to achieve the immediate torque request. The actuation mode module 314 may use spark retard for the remainder of the torque reduction by outputting the immediate torque request to the immediate torque control module 320. If there is not enough spark reserve capacity, the actuation mode module 314 may reduce the predicted torque request going to the predicted torque control module 316.

In the auto actuation mode, the actuation mode module 314 may decrease the predicted torque request output to the predicted torque control module 316. The predicted torque may be reduced only so far as is necessary to allow the immediate torque control module 320 to achieve the immediate torque request using spark retard.

The immediate torque control module 320 receives an estimated torque from a torque estimation module 324 and sets spark advance using the spark actuator module 126 to achieve the desired immediate torque. The estimated torque may represent the amount of torque that could immediately be produced by setting the spark advance to a calibrated value.

When the spark advance is set to the calibrated value, the resulting torque (maintaining the current APC) may be as close to mean best torque (MBT) as possible. MBT refers to the maximum torque that is generated for a given APC as spark advance is increased while using high-octane fuel. The spark advance at which this maximum torque occurs may be referred to as MBT spark. The torque at the calibrated value may be less than the torque at MBT spark because of, for example, fuel quality and environmental factors.

The immediate torque control module 320 can demand a smaller spark advance than the calibrated spark advance in order to reduce the estimated torque of the engine to the immediate torque request. The immediate torque control module 320 may also decrease the number of cylinders activated via the cylinder actuator module 120. The cylinder actuator module 120 then reports the actual number of activated cylinders to the immediate torque control module 320 and the torque estimation module 324.

When the number of activated cylinders changes, the cylinder actuator module 120 may report this change to the immediate torque control module 320 before reporting the change to the torque estimation module 324. In this way, the torque estimation module 324 receives the changed number of cylinders at the same time as the updated spark advance. The torque estimation module may estimate an actual torque that is currently being generated at the current APC and the current spark advance.

The torque estimation module 324 may receive the spark advance from the spark actuator module 126, which may adjust spark advance received from the immediate torque control module 320. The adjustments may be based on factors such as an MBT spark advance override, spark limits based on preventing knock, and minimum and maximum spark limits. Spark limits may be dynamic, depending on engine operation conditions.

The predicted torque control module 316 receives the estimated torque and may also receive a measured mass air flow (MAF) signal and an engine speed signal, referred to as a revolutions per minute (RPM) signal. The predicted torque control module 316 may generate a desired manifold absolute pressure (MAP) signal, which is output to a boost scheduling module 328. The boost scheduling module 328 uses the desired MAP signal to control the boost actuator module 162. The boost actuator module 162 then controls a turbocharger or a supercharger.

The predicted torque control module 316 may generate a desired area signal, which is output to the throttle actuator module 116. The throttle actuator module 116 then regulates the throttle valve 112 to produce the desired throttle area. The predicted torque control module 316 may use the estimated torque and/or the MAF signal in order to perform closed loop control, such as closed loop control of the desired area signal.

The predicted torque control module 316 may also generate a desired air per cylinder (APC) signal, which is output to a phaser scheduling module 332. Based on the desired APC signal and the RPM signal, the phaser scheduling module 332 commands the intake and/or exhaust cam phasers 148 and 150 to calibrated values using the phaser actuator module 158.

The torque estimation module 324 may use current intake and exhaust cam phaser angles along with the MAF signal to determine the estimated torque. The current intake and exhaust cam phaser angles may be measured values. Further discussion of torque estimation can be found in commonly assigned U.S. Pat. No. 6,704,638 entitled "Torque Estimator for Engine RPM and Torque Control," the disclosure of which is incorporated herein by reference in its entirety.

Figure 5:
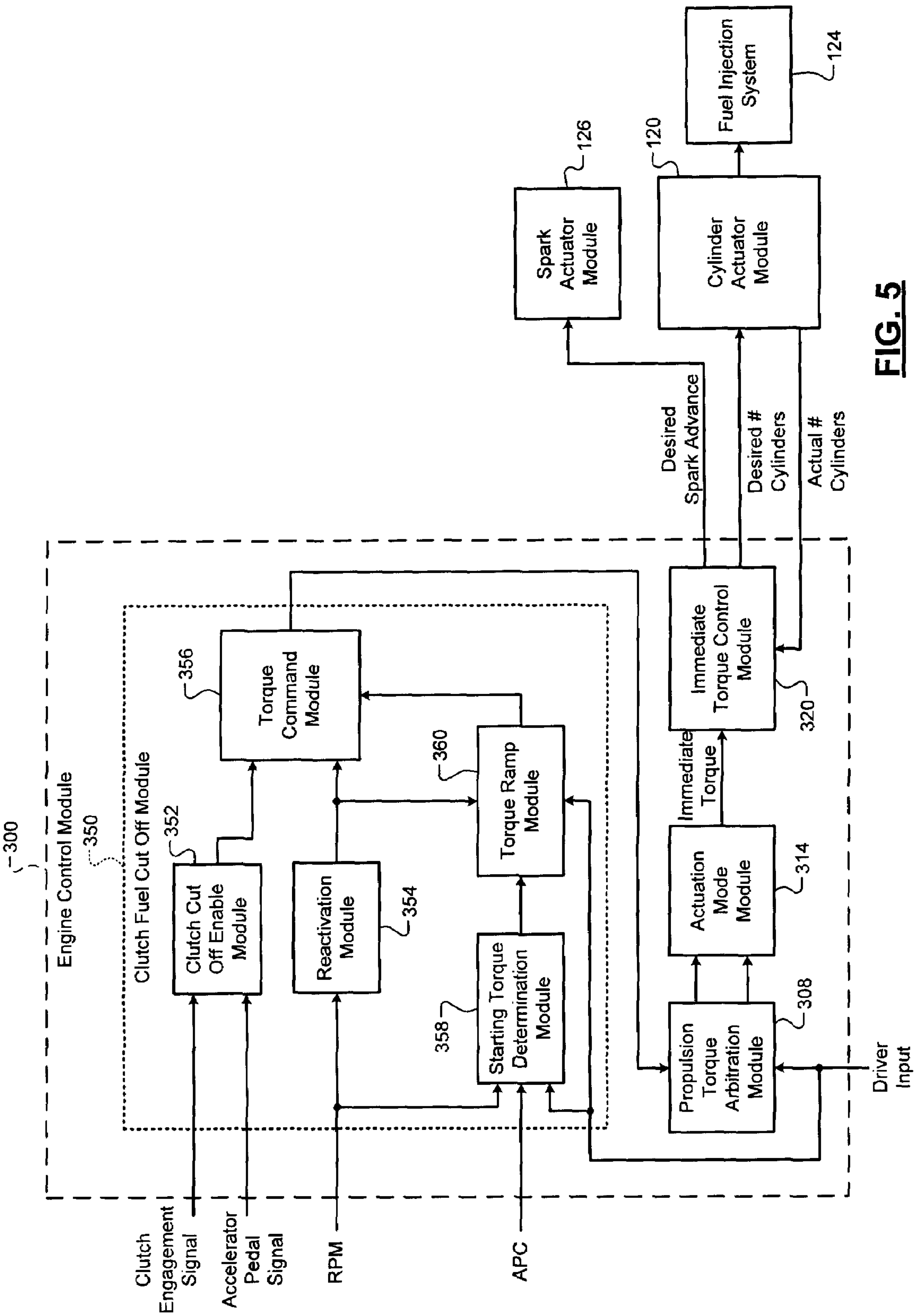
FIG. 5 is a functional block diagram of elements of the exemplary engine control system of FIG. 4 according to the principles of the present disclosure.

Referring now to FIG. 5, a functional block diagram of selected elements of the exemplary engine control system of FIG. 4 is presented. The clutch fuel cut off module 350 may include a clutch cut off enable module 352, a reactivation module 354, a torque command module 356, a starting torque determination module 358, and a torque ramp module 360.

The clutch cut off enable module 352 may determine that an engine torque decrease is desired based on a clutch engagement signal and an accelerator pedal signal. The clutch cut off enable module 352 may generate a clutch cut off signal to instruct the torque command module 356 to cut off engine torque. The clutch cut off signal may be generated when the clutch engagement signal indicates that the user has disengaged the clutch and the accelerator pedal indicates that pressure on the accelerator pedal is below a threshold.

In various implementations, this threshold may be set so that any pressure on the accelerator pedal disables clutch cut off mode. In various implementations, clutch cut off mode may be entered when, within a predetermined period, the user has disengaged the clutch and reduced pressure on the accelerator pedal below the threshold. Clutch cut off mode may be cancelled if accelerator pedal pressure increases above a second threshold once clutch cut off mode has been entered. In various implementations, the second threshold may be greater than the threshold, producing hysteresis.

When the torque command module 356 receives the clutch cut off signal from the clutch cut off enable module 352, the torque command module 356 may request an engine off torque from the propulsion torque arbitration module 308. This request may be accompanied by an indication that the actuation mode module 314 should be in maximum range mode, where the actuation mode module 314 can turn off cylinders in order to meet the torque request.

The reactivation module 354 receives engine RPM and determines when engine RPM has decreased to a desired speed. When this desired speed is reached, the reactivation module 354 generates a reactivation signal to instruct the torque command module 356 to increase the torque request. The desired speed may be determined based on the current gear and/or an expected next gear.

The increased torque request may be provided by the torque ramp module 360. The torque ramp module 360 may generate a torque ramp from a first torque value up to a torque value determined by the driver input. For example only, this ramp may be linear. The torque ramp module 360 may begin the torque ramp when the reactivation signal is generated. The first torque value is provided by the starting torque determination module 358.

For example only, a method for determining the first torque value is now described. The starting torque determination module 358 determines a percentage based upon APC and RPM. For example only, this percentage may be retrieved from a look-up table indexed by APC and RPM. A torque difference is determined between the driver requested torque and a minimum spark torque. This difference is multiplied by the percentage and then added to the minimum spark torque to determine the first torque value. The percentage therefore defines the torque at which the torque ramp will begin within a range defined by the minimum spark torque and the driver requested torque.

The minimum spark torque corresponds to the torque that could be produced at the current APC with all cylinders being fueled and the spark advance set to the minimum spark advance. The minimum spark advance for a given set of engine operating conditions is the minimum spark advance that the engine controller will allow for the given set of engine operating conditions. The minimum spark advances for various engine operating conditions may be determined during calibration of the engine controller.

For example only, the minimum spark advance may be limited by the onset of misfire. Decreasing the spark advance below the minimum spark advance may result in misfire occurring and incomplete combustion. When a cold catalytic converter receives unburned fuel due to incomplete combustion, the unburned fuel may be exhausted, thereby increasing emissions. If the catalytic converter is hot, the unburned fuel may react within the catalytic converter and increase a temperature beyond an operating temperature, possibly resulting in damage to the catalytic converter.

When all cylinders are fueled in an engine, each cylinder contributes rotational acceleration to the crankshaft as that cylinder fires. Misfire may be detected as an insufficient crankshaft acceleration. When calibrating minimum spark advance, indicated mean effective pressure (IMEP) may be used to determine when misfire will occur. An IMEP value may be a calculated constant pressure that would produce the same work per cycle if applied to the piston as a measured cycle of actual combustion produced. An IMEP value may be determined for each cylinder per engine cycle in a dynamometer setting using combustion measurement equipment.

The IMEP values may be used to determine when misfire will occur. The spark advance may be decreased until a certain IMEP condition is reached. For example, IMEP conditions may be based on statistical analysis of IMEP values for one or more cylinders across multiple engine cycles.

For example only, the minimum spark advance may be determined for various operating conditions based on inputs such as RPM, APC, cam phaser position, and engine temperature. For example only, a lookup table of minimum spark advances may be indexed by RPM and APC. When the intake or exhaust cam phasers are moved from their default values, the minimum spark advance may be compensated based on these moves. In addition, the minimum spark advance may be compensated based on engine coolant temperature.

When the torque command module 356 receives the reactivation signal from the reactivation module 354, the torque command module 356 may indicate to the actuation mode module 314 that all cylinders should be reactivated. This may be indicated by instructing the actuation mode module 314 to enter the pleasible mode, where spark is used to meet torque requests while all cylinders remain activated.

Figure 6:
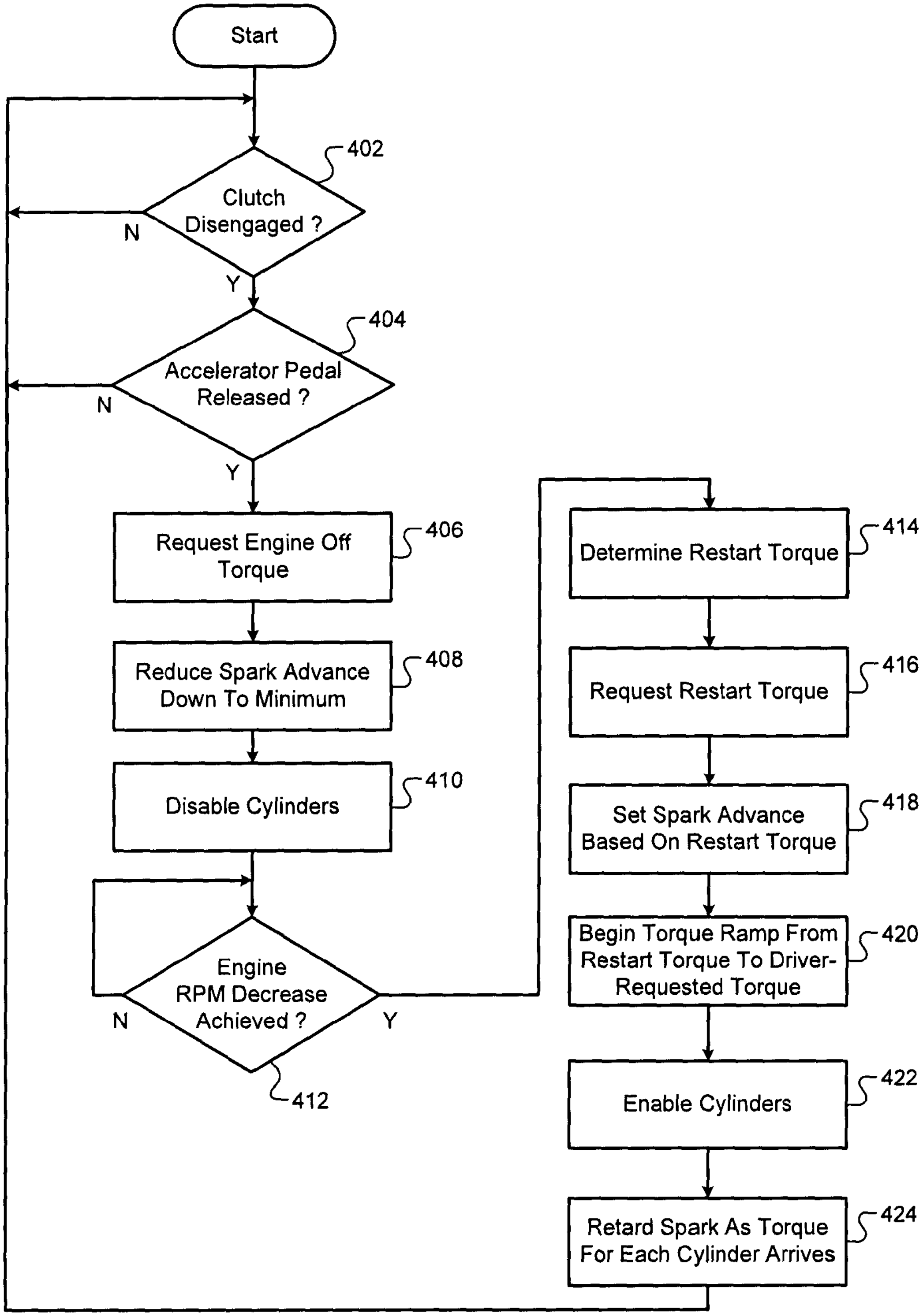
FIG. 6 is a flowchart that depicts exemplary steps performed for clutch fuel cut off by elements shown in FIG. 5 according to the principles of the present disclosure.

Referring now to FIG. 6, a flowchart depicts exemplary steps performed by elements shown in FIG. 5. Control begins in step 402, where control determines whether the clutch has been disengaged. If so, control transfers to step 404; otherwise, control remains in step 402. In step 404, control determines whether the accelerator pedal has been released. If so, control transfers to step 406; otherwise, control returns to step 402.

In step 406, control requests engine off torque. Control continues in step 408, where spark advance is reduced to the lowest value at which complete combustion is still achieved. The torque at this spark advance may be referred to as the minimum spark torque. Control continues in step 410, where all cylinders are disabled. Control continues in step 412, where control determines whether the desired decrease in engine RPM has been achieved. If so, control transfers to step 414; otherwise, control remains in step 412.

In step 414, control determines a restart torque value. For example only, this restart torque value may be determined by determining a percentage value. This percentage value is multiplied by the difference between a driver requested torque and a minimum spark torque. The result of this multiplication may be added to the minimum spark torque to determine the restart torque.

Control continues in step 416, where control requests that this restart torque be produced. Control continues in step 418, where spark advance is set based on the restart torque. Control continues in step 420, where a torque ramp is initiated from the restart torque to the driver requested torque. Control continues in step 422, where all cylinders are instructed to be re-enabled. Control continues in step 424, where the spark is abruptly retarded (spark advance is reduced) to coincide with the torque beginning to be realized for each cylinder's reactivation. Control then returns to step 402.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system comprising:

a clutch cut off enable module that generates an enable signal based on a clutch engagement signal and an accelerator pedal signal; and a torque control module that, in response to the enable signal, (i) reduces a spark advance of an engine directly to a minimum value and (ii) disables fueling of cylinders of the engine, wherein the minimum value is a minimum allowed spark advance for current airflow of the engine and is less than a mean best torque value of spark advance for the current airflow, wherein the torque control module enables fueling of the cylinders based on an increasing torque request, wherein the torque control module, after enabling fueling of the cylinders, performs a plurality of spark advance decreases, wherein each of the spark advance decreases corresponds to one of the cylinders and offsets a torque increase realized from enabling fueling to the cylinder, and wherein each of the spark advance decreases operates equally on all of the cylinders of the engine for which fueling is enabled.

2. The engine control system of claim 1 wherein the torque control module disables fueling of all the cylinders of the engine in response to the enable signal.

3. The engine control system of claim 1 wherein the clutch cut off enable module generates the enable signal when both (i) the clutch engagement signal indicates that a manual transmission clutch is disengaged and (ii) the accelerator pedal signal indicates that a pressure on an accelerator pedal is less than a threshold value.

4. The engine control system of claim 1 further comprising a torque request module that generates the torque request, wherein the torque request begins at a first torque and increases to a driver requested torque.

5. The engine control system of claim 4 wherein the first torque is based on a minimum spark torque and the driver requested torque, wherein the minimum spark torque corresponds to all the cylinders being fueled and the minimum value being used for spark advance.

6. The engine control system of claim 5 wherein the first torque is set at a value between the minimum spark torque and the driver requested torque based on a percentage, wherein the percentage is determined based on engine speed and airflow.

7. The engine control system of claim 1 wherein the torque request is generated when engine speed reaches a predetermined speed after fueling of the cylinders has been disabled.

8. The engine control system of claim 7 wherein the predetermined speed is based on a gear ratio for a higher gear than a gear selected when the enable signal is generated.

9. The engine control system of claim 1 wherein the minimum allowed spark advance for the current airflow is calibrated to prevent misfire.

10. A method comprising:

generating an enable signal based on a clutch engagement signal and an accelerator pedal signal;

determining a minimum value of allowed spark advance for current airflow of an engine, wherein the minimum value is less than a mean best torque value of spark advance for the current airflow;

in response to generation of the enable signal, (i) reducing a spark advance of all cylinders of the engine directly to the minimum value and (ii) disabling fueling of cylinders of the engine;

enabling fueling of the cylinders based on an increasing torque request; and after enabling fueling of the cylinders, performing a plurality of spark advance decreases, wherein each of the spark advance decreases corresponds to one of the cylinders and offsets a torque increase realized from enabling fueling to the cylinder, and wherein each of the spark advance decreases operates equally on all of the cylinders of the engine for which fueling is enabled.

11. The method of claim 10 further comprising disabling fueling of all the cylinders of the engine in response to generation of the enable signal.

12. The method of claim 10 further comprising generating the enable signal when both (i) the clutch engagement signal indicates that a manual transmission clutch is disengaged and (ii) the accelerator pedal signal indicates that a pressure on an accelerator pedal is less than a threshold value.

13. The method of claim 10 further comprising generating the torque request, wherein the torque request begins at a first torque and increases to a driver requested torque, wherein the first torque is based on a minimum spark torque and the driver requested torque, wherein the minimum spark torque corresponds to all the cylinders being fueled and the minimum value being used for spark advance.

14. The method of claim 13 further comprising:

determining a percentage based on engine speed and airflow; and setting the first torque at a value between the minimum spark torque and the driver requested torque based on the percentage.

15. The method of claim 10 further comprising generating the torque request when engine speed reaches a predetermined speed after fueling of the cylinders has been disabled.

16. The method of claim 15 further comprising determining the predetermined speed based on a gear ratio for a higher gear than a gear selected when the enable signal is generated.

17. The method of claim 10 wherein the minimum allowed value of spark advance for the current airflow is calibrated to prevent misfire.

18. The engine control system of claim 1 wherein the torque control module performs each of the spark advance decreases as the torque increase corresponding to the respective cylinder is realized.

19. The engine control system of claim 1 wherein the torque control module gradually increases spark advance between the plurality of spark advance decreases.

20. The method of claim 10 wherein each of the spark advance decreases is performed as the torque increase corresponding to the respective cylinder is realized.

21. The method of claim 10 further comprising gradually increasing spark advance between the plurality of spark advance decreases.

* * * * *